US008430363B2

(12) United States Patent
Hesser et al.

(10) Patent No.: US 8,430,363 B2
(45) Date of Patent: Apr. 30, 2013

(54) TRAIN WHEEL BEARING TEMPERATURE DETECTION

(75) Inventors: Peter Hesser, Harthausen (DE); Thomas Strecker, Rauenberg (DE); Miles Metschke, Kansas City, MO (US); Thomas Shanahan, Lee's Summit, MO (US); Daniel Kurt Stevens, Summerville, SC (US); Mathias Hartmann, Bad Durkheim (DE)

(73) Assignee: Progress Rail Services Corp, Albertville, AL (US)

( * ) Notice: Subject to any disclaimer, the term of this patent is extended or adjusted under 35 U.S.C. 154(b) by 490 days.

(21) Appl. No.: 11/253,160

(22) Filed: Oct. 18, 2005

(65) Prior Publication Data
US 2006/0131464 A1 Jun. 22, 2006

Related U.S. Application Data

(60) Provisional application No. 60/684,063, filed on May 24, 2005, provisional application No. 60/681,858, filed on May 17, 2005, provisional application No. 60/633,536, filed on Dec. 6, 2004.

(51) Int. Cl.
*B61K 1/00* (2006.01)
(52) U.S. Cl.
USPC .................................................... 246/169 R
(58) Field of Classification Search .............. 246/167 R, 246/168, 169 R, 169 A, 169 D
See application file for complete search history.

(56) References Cited

U.S. PATENT DOCUMENTS

| 3,402,290 | A | | 9/1968 | Blackstone et al. |
| 4,068,811 | A | | 1/1978 | Caulier |
| 5,149,025 | A | | 9/1992 | Utterback et al. |
| 5,331,311 | A | * | 7/1994 | Doctor ........................... 340/463 |
| 5,381,700 | A | | 1/1995 | Grosskopf, Jr. et al. |
| 5,397,900 | A | * | 3/1995 | Wetzler ......................... 250/342 |
| 5,448,072 | A | | 9/1995 | Gallagher |
| 5,677,533 | A | | 10/1997 | Yaktine et al. |
| 6,872,945 | B2 | | 3/2005 | Bartonek |
| 6,881,951 | B2 | | 4/2005 | Bartonek |
| 2003/0006655 | A1 | * | 1/2003 | Zhang ............................ 310/52 |

FOREIGN PATENT DOCUMENTS

FR 2752806 3/1998

\* cited by examiner

*Primary Examiner* — Robert McCarry, Jr.

(57) ABSTRACT

A system (10) for sensing a condition of a rail vehicle undercarriage component (e.g., 18) includes a sensor (e.g., 12) comprising an array of infrared sensing elements (29). Each of the elements may be aimed at a different region of a target area (e.g., 32) of a rail vehicle undercarriage component to generate respective scanning waveform signature data corresponding to each different region. The sensor may be oriented so that at least one of the elements receives unobstructed infrared emissions (e.g., 33) from the undercarriage component of a rail vehicle passing the sensor. The system also includes a memory (42) for storing characteristic waveform signature data corresponding to known undercarriage components. In addition, the system includes a processor (40) for processing the scanning waveform signature data with respect to the characteristic waveform signature data stored in memory to identify a type of the rail vehicle undercarriage component being scanned and to extract information indicative of a health condition of the rail vehicle undercarriage component being identified.

36 Claims, 10 Drawing Sheets

FIG. 16B

TRAIN WHEEL BEARING TEMPERATURE DETECTION

CROSS REFERENCE TO RELATED APPLICATIONS

This application claims benefit of the May 24, 2005 filing date of U.S. provisional patent application No. 60/684,063, the May 17, 2005 filing date of U.S. provisional patent application No. 60/681,858, and the Dec. 6, 2004 filing date of U.S. provisional patent application No. 60/633,536.

FIELD OF THE INVENTION

This invention relates generally to the field of rail transportation, and more particularly, to determining a condition of train undercarriage components.

BACKGROUND OF THE INVENTION

The safe and reliable operation of a railroad system is dependent upon the integrity of the rolling mechanisms of the vehicles traveling over the rails. For example, it is important to monitor a condition of train wheel bearings to determine if a degree of wear on the bearing indicates that the bearings need to be inspected and repaired or replaced. Worn or damaged bearings increase the rolling friction of the axle thereby increasing the power required to pull the train. In addition, worn or damaged bearings may cause excessive wear to the train axle and, in the case of failure of the bearing, may even cause the axle to lock up, preventing rotation of the wheel, resulting in a potential fire hazard due to the heat build up and potential sparking caused by friction of the locked wheel scraping along the rail.

Bearing temperatures may be directly monitored using rail car mounted temperature sensors, such as thermocouples, disposed near the bearings. However, such techniques having proven to be unreliable and/or relatively costly to operate and maintain. One way of indirectly monitoring the a condition train wheel bearings is to sense a temperature of the wheel bearing indirectly through a bearing box surrounding the wheel bearing on a rail car of a train. For example, infrared radiation (IR) sensors have been mounted along a rail to detect IR energy emitted by an outer wheel bearing and indicative of a temperature of the wheel bearing, as the rail car passes the IR sensor. However, such a system may be limited to a certain rail car wheel configuration that allows an unimpeded sensing path from the sensor to the bearing box, which may not be achievable for all rail car wheel configurations. Furthermore, inner wheel bearings used on some rail cars and locomotives have proven difficult to monitor due to sensing paths being blocked by suspension components and the differences among inner wheel bearing arrangements. In addition, the presence of IR sources near an inner bearing being monitored, such as gear boxes or suspension springs, and the effects of lateral movement of the axle bringing other IR sources into a sensing path, such as during wheel hunting, may result in erroneous IR readings for the bearing. Other IR sources which may interfere with a temperature measurement of a train wheel bearing may include hot lubricant leakage, sun reflections, differential heating on different sides of a train, sparks from skidding wheels, and brake hardware, such as brake disks. Accordingly, an improved system and method for sensing a temperature of train wheel bearings is desired.

DETAILED DESCRIPTION OF THE INVENTION

A train undercarriage component temperature detection system may be used to obtain data, such as IR emission data, indicative of a temperature of a sensed railcar wheel or wheel bearing as the vehicle rolls past a sensing device of the system. The system may include a sensing devices oriented to receive unobstructed IR emissions from rail car undercarriage components. In one aspect, a sensor may include an array of sensing elements sensing adjacent regions of a target area of a component, such as an inner bearing and an outer bearing of an axle, respectively. The data received from the sensing devices is then processed to extract information indicative of a health of the respective sensed component. The data may be processed to recognize a characteristic waveform profile corresponding to a known component type and reduce spurious IR emissions received from IR sources in the vicinity of a sensed component. A suspension for the system mounted within a railroad tie, or sleeper, is also provided to reduce the effects of shock and vibration that may be experienced by the system. Waveform analysis methods may be used on the data to identify a type of component and then, based on the type of component being scanned, identify conditions of the scanned component that may be indicative of an abnormal health condition.

Figure 1:
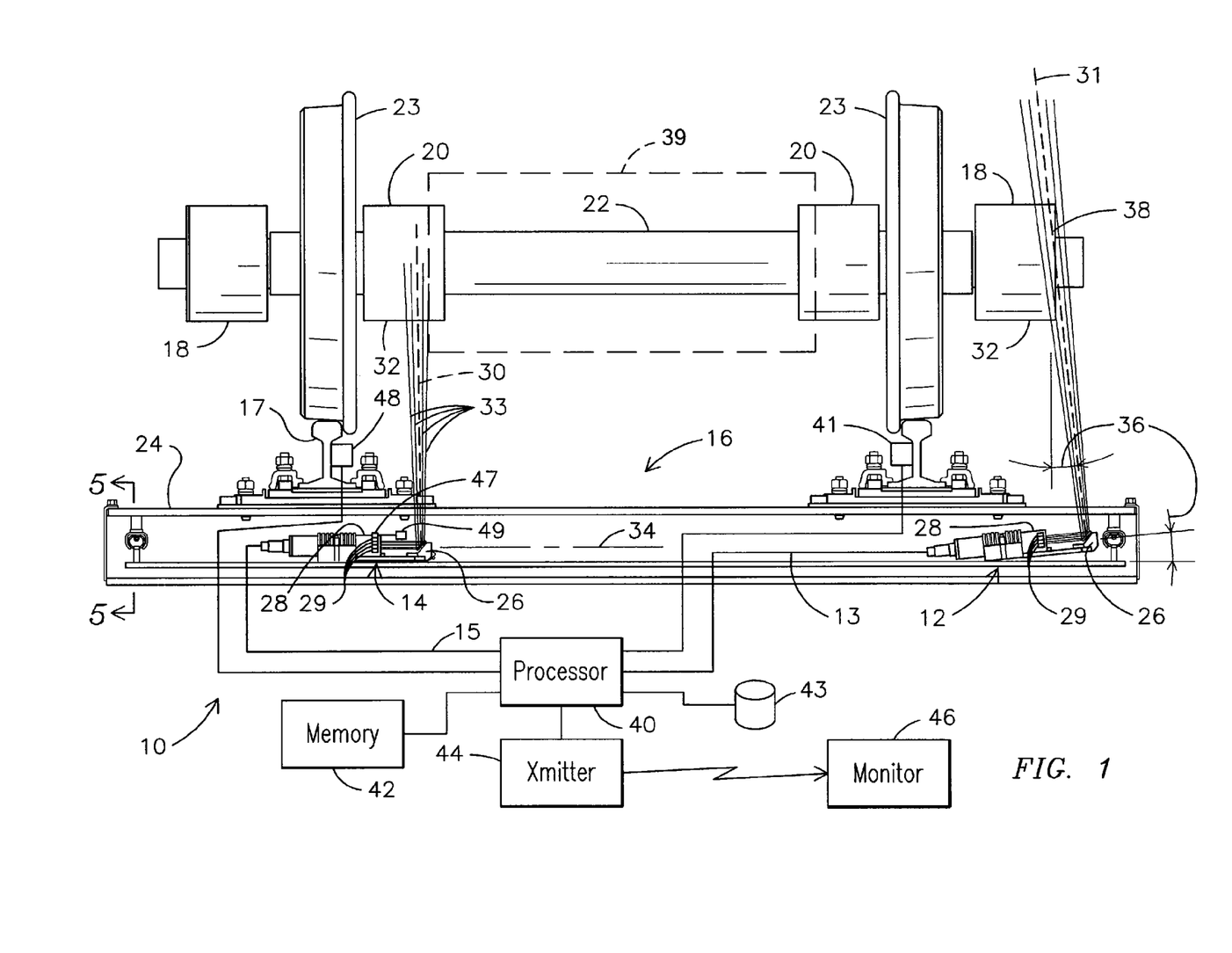
FIG. 1 is a cross sectional illustration of an exemplary train wheel bearing temperature detection system, a portion of the system being embedded in a metal railroad tie, or sleeper.
Figure 11:
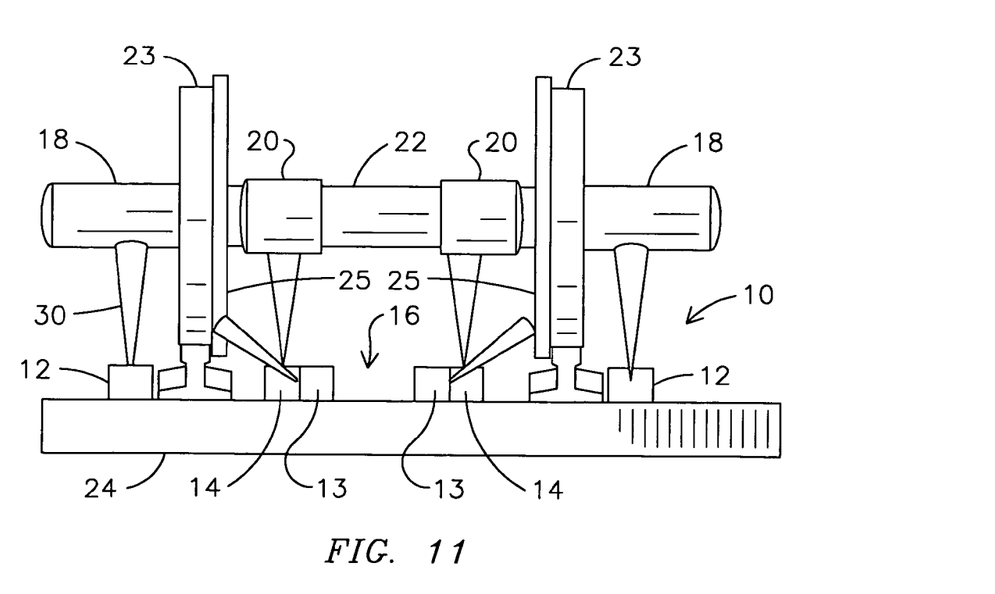
FIG. 11 is a schematic representation of an exemplary train wheel bearing temperature detection system.

FIG. 1 illustrates an exemplary train undercarriage component temperature detection system 10 for detecting wheel bearing temperatures. FIG. 11 is schematic representation of such a system 10. One or more sensors, such as outer bearing sensor 12 and inner bearing sensor 14, may be placed in a position along a track 16 to obtain data from wheel bearings, such as an inner bearing 20 and an outer bearing 18, of a train axle 22 as the axle passes the sensors 12, 14. The sensors 12, 14 may be positioned in a rail bed of the track 16, such as within a cross tie or sleeper 24 adapted to contain the sensors 12, 14, and to receive IR emissions from the bearings 18, 20. In an aspect of the invention, each sensor 12, 14 may include a mirror 26 to redirect IR emissions into a receiver 28 of the sensor 12, 14 to allow the receiver 28 to be oriented horizontally within the sleeper 24. The sensors 12, 14 may be positioned along an axis 34 parallel to the train axle 22 to receive IR emissions emitted from a bottom 32 of a bearing 18, 20 along a path 30 perpendicular to the axle 22. The emissions may be redirected by the mirror 26, for example, at a right angle with respect to the path 30, into the receiver 28.

As shown in FIG. 11, wheel IR sensors 13 may be placed in a position along the track 16 to obtain IR emission data from the wheels 23, such as inner faces 25 of the wheels 23, as the axle passes the sensors 13. In another aspect of the invention shown in FIG. 14, a portion of the train axle 22, such as an axle portion 111 near an inner bearing 20, may be targeted by a sensor 113 to obtain IR emission data from the axle portion 111.

Returning to FIG. 1, each sensor 12, 14 may further include a plurality of infrared sensing elements 29, such as IR radiation sensitive diode detectors or an IR sensitive planar array having individually resolvable pixels, arranged, for example, vertically within the receiver 28 to receive respective portions 33 of the IR emissions radiated by respective bearings 18, 20. Accordingly, each infrared sensing element 29 receives a respective portion of IR energy from a target area, such as the bottom 32 or end 38 of the bearing 18, 20, spaced away from portions of IR emissions received by other IR sensing elements 29 of the sensor. In an aspect of the invention, the sensors 12,14 may include five elements 29, such as Mercury/Cadmium/Tellurium (HgCdTe) elements, positioned in an array within the sensor 12, 14. Four elements may be used for scanning, and a fifth element 47 may be used for calibrating the other elements 29. The calibrating element 47 may be positioned to view a reference Peltier effect semiconductor cooler 49 maintained at a desired temperature, such as −40 degrees Celsius, to provide a DC-coupled benchmark for sensed heat signatures. Such a design may allow an absolute temperature measurement accuracy of +/−0.1 degree Celsius. The sensors 12, 14 may transmit through a zinc-selenid lens and view the railcar through an external shutter mounted on the instrumented tie, with a front surface mirror 26 in the viewing path. The mirror 26 may include a gold front surface to resist tarnishing or bonding with other materials. The mirror 26 may be rotated, such as at 10,000 revolutions per minute, to fling off contaminants that may come to rest on the mirror 26.

While the perpendicular orientation of the path 30 may allow the sensors 12, 14 to receive IR radiation unblocked by other components, (such as suspension components positioned near the bearings 12, 14) an unimpeded path from the bearing 18, 20 to the mirror 26 may not be possible to achieve in some cases. For example, the bottom 32 of a locomotive outer bearing 18 may be obscured by a shroud (not shown), thereby rendering it difficult to maintain a clear path to the bottom 32 of the outer bearing 18 for receiving IR emissions. In an aspect of the invention, the outer bearing sensor 12 may be inclined from the axis 34 by an angle 36 so that an outer bearing imaging path 31 may be inclined away from perpendicular with respect to the axle 22 by corresponding angle 36. For example, the bearing imaging path 31 may be positioned at an acute angle with respect to a face 38 of the outer wheel bearing 18. Consequently, an IR emission radiated from an un-obscured portion of the outer bearing 18, such as the face 38 of the outer bearing 18, may be sensed by the sensor 12 positioned in the railbed below the train without interference from components positioned near the bearing 18.

The IR emissions received from the respective portions 33 and converted into respective signals indicative of a strength of the IR energy received may be provided to a processor 40 for further processing of the received signals, for example, to determine indications of abnormal bearing heating. In an embodiment of the invention, the processor 40 may be disposed remotely from the sleeper 24 and may be connected to the sensors 12, 14 via respective cables 15, 45. The processor 40 may further receive wheel passage information provided by one or more wheel sensors 48 such as inductive sensors, for example, spaced longitudinally along rail 17. The processor 40 may be in communication with memory 42, for example, to receive analytically and/or experimentally derived radiation pattern information from the memory 42 to perform pattern recognition analysis in accordance with and aspect of the invention. Processed information, such as information identifying a bearing condition of a sensed wheel bearing, may be transmitted via transmitter 44 to a central monitor 46 for reporting and/or notification of a degraded bearing condition requiring servicing.

The processor 40 also be in communication with a train database 43 having reference information for each passing vehicle to the relative axle count within the train and the relative vehicle position within the train. For example, the reference information may be downloaded from a remote source via transmitter 44 being configured as a transceiver for receiving and transmitting information. In another aspect, specific registered car number data from an external system, such as an AEI tag reader system, may be input to the database 43 to tag the vehicle data with a unique vehicle registration number.

In an aspect of the invention, the system may 10 configured for acquiring 120 samples per element 29 per bearing detected at speeds from about 1.86 mph to 310 miles per hour. The sampling rate may be scaled to a train velocity, so that regardless of the train speed, 120 samples per element 29 per bearing measured may be captured and 240 samples per element 29 per wheel measured. Bearing temperatures up to 356 degrees Fahrenheit may be detected and wheel temperatures up to 1,112 degrees Fahrenheit may be measured with the system 10.

Figure 12:
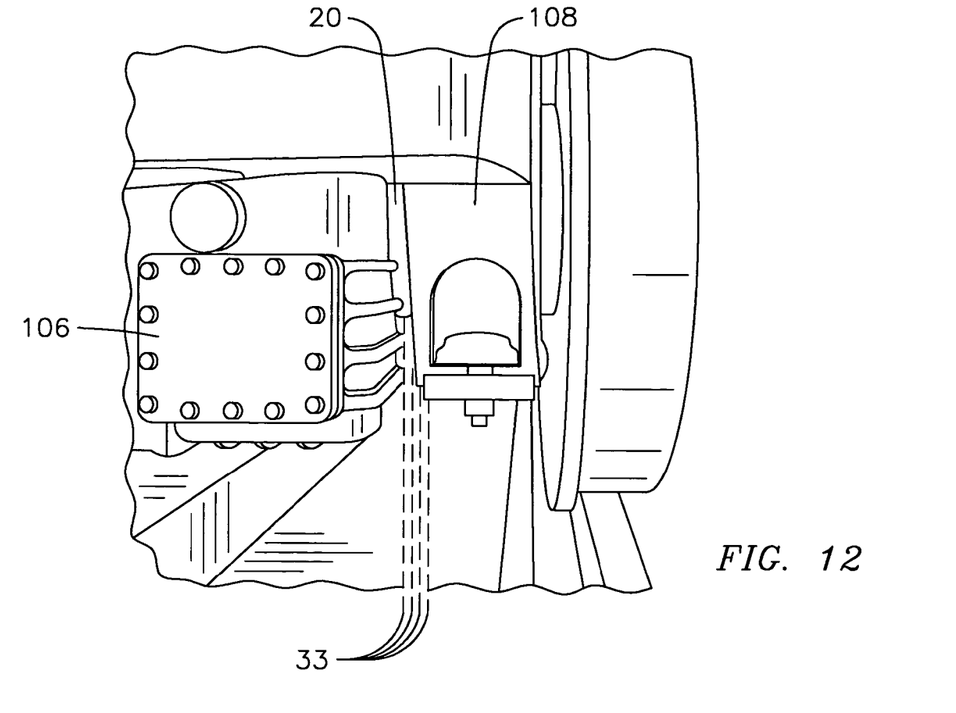
FIG. 12 illustrates exemplary IR scanning paths for scanning an inner bearing between a traction motor and a carrier bracket of a locomotive.

The prior art techniques for sensing IR energy radiated by a train wheel bearing for detecting a wheel bearing having temperature higher than a normal operating temperature generate unreliable indicators under certain circumstances, thereby resulting in false hot bearing indications causing unnecessary stoppage of the train to inspect the bearings, or missed hot bearing that should have been inspected. Applicant has found that processing of the IR energy measurement data under the techniques set forth in this invention can provide hot bearing determinations that are more reliable and accurate. Some problems experienced when attempting to perform remote IR energy measurements of train wheel bearings include spurious IR noise, IR sources close to the bearing, such as springs or gear boxes, different configurations of train wheel bearings and associated suspension and wheel components, and movement of the train axle and associated components, into a detection path of an IR sensor, such as may be experienced during a wheel hunting condition. In particular, the inner bearing 20 of a train axle 22 may be positioned close to a gear box 39 (indicated by dotted line) that may also be a source of IR energy that may interfere with the IR emissions emitted by the bearing 20. Consequently, a portion of the gear box 39 or other component radiating IR energy, such as a suspension spring (not shown), may provide one or more portions 33 of IR emissions to the sensor 14, such as when the axle moves laterally during hunting, resulting in an IR energy level that erroneously includes an IR energy component from both the inner bearing 20 and one or more other IR sources, such as the gear box 39. In another configuration shown in FIG. 12, an inner bearing may be viewable through a relatively narrow aperture between a traction motor 106 and a carrier bracket 108 of a locomotive, making it difficult to obtain an accurate temperature reading of the inner bearing due to interference of the traction motor 106 and a carrier bracket 108.

Furthermore, geometric differences among configurations of train axle, wheel, and suspension components may result in erroneous readings. For example, if the measurement system 10 is configured to sense a certain detection target area for a corresponding geometric configuration of train axle, wheel, and suspension component, but encounters a different configuration (such as a larger gear box entering the field of inspection or an outer bearing having a different height above the rail bed than the system is configured for due, for example, to a different wheel diameter) the measurement system 10 may sense an erroneous IR reading. It will be appreciated that aspects of the present invention may be used for distinguishing between one or more different components that may enter a relatively hot condition indicative of a component malfunction. For example, it may be desirable to determine whether a bearing or a gear box is a component with a hot condition. Accordingly, the techniques of the present invention are not limited to a detection of bearing conditions because such techniques may also be applied for detecting malfunction conditions in other mechanical components such as the gearbox, brake disks, and/or brake pads etc.

Figure 2:
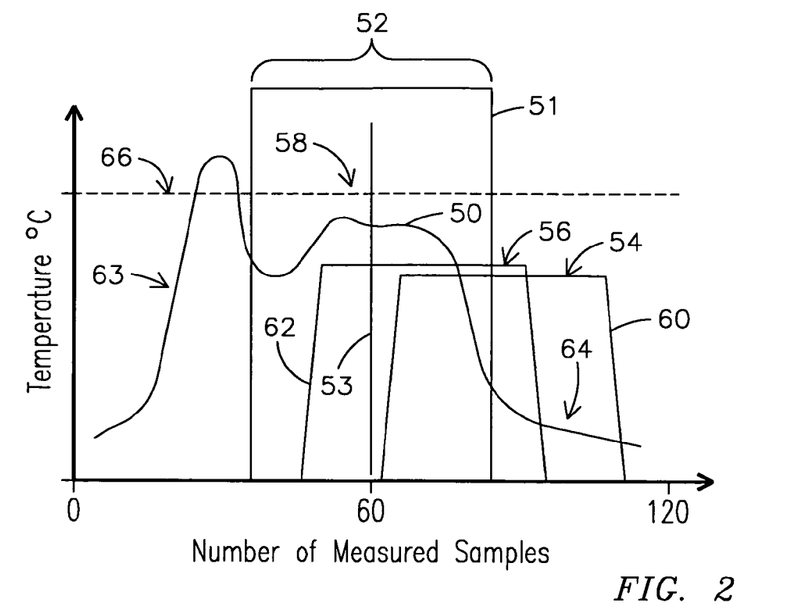
FIG. 2 illustrates an exemplary graph of temperature versus IR sampling points over time for an IR radiation profile received from a train wheel bearing by the detection system of FIG. 1.

An improved detection system capable of identifying elevated bearing temperatures for a variety of train wheel bearing, axle, wheel, and suspension component configurations, and conditions of these train components includes performing one or more innovative processes on the received IR energy to determine a temperature of the bearing from which a health condition of the bearing may be inferred. FIG. 2 illustrates an exemplary graph of temperature versus temperature sampling points over time for received IR emissions from a train wheel bearing. FIG. 2 shows wheel detection pulses 54, 56 generated, for example, by inductive wheel detectors 48 as a train wheel 23 passes the detector 48 (as shown FIG. 1.) IR emission data may be continuously collected by the processor 40 monitoring the data received from the IR sensors 12, 14, relative, for example, to a time when a wheel 23 is initially detected, as indicated by a rising edge 62 of a first pulse 56. Data collection may be completed at a time relative to a falling edge of wheel detection pulse, such as a falling edge 60 of the second pulse 54. Accordingly, a timing of IR emission capture may be correlated with arrival of a wheel 23 to ensure that wheel bearing IR emissions corresponding to the passing wheel 23 is captured. By using two wheel sensors and measuring a time between wheel detection pulses, a speed of the train may be determined and used to dynamically adjust a capture time relative to the wheel detection pulses to ensure that wheel bearing emissions are captured as the wheel passes the sensors 12, 14.

In an aspect of the invention, a sampling technique may be used to isolate a windowed portion 58 of the received IR temperature profile 50 provided to the processor 40 by a respective sensing element 29 of the sensor 12, 14 of FIG. 1. The windowing technique may be employed to eliminate spurious IR signals outside the windowed portion 58 that may have been captured. A width 52 of the window 51 may be predetermined or dynamically adjusted to achieve capture of the desired windowed portion 58 of the profile 50 to eliminate undesired portions 63, 64 of the waveform outside the window portion 58. Such undesired portions may include IR emission profiles indicative of other components radiating IR energy in the vicinity of the wheel bearing, such as springs, exhaust pipes, or brake components. For example, the portion 63 exceeding an alarm threshold 66, such as a temperature alarm threshold, may be ignored because the portion 63 is outside the desired potion 58 and may be indicative of IR energy radiated from another part of the train different from the bearing. In an aspect of the invention, the position of the window 51 may be adjusted to compensate for variations among railcars and or rail car components to ensure that at least one element 29 views a temperature peak portion of a component targeted.

Figure 15:
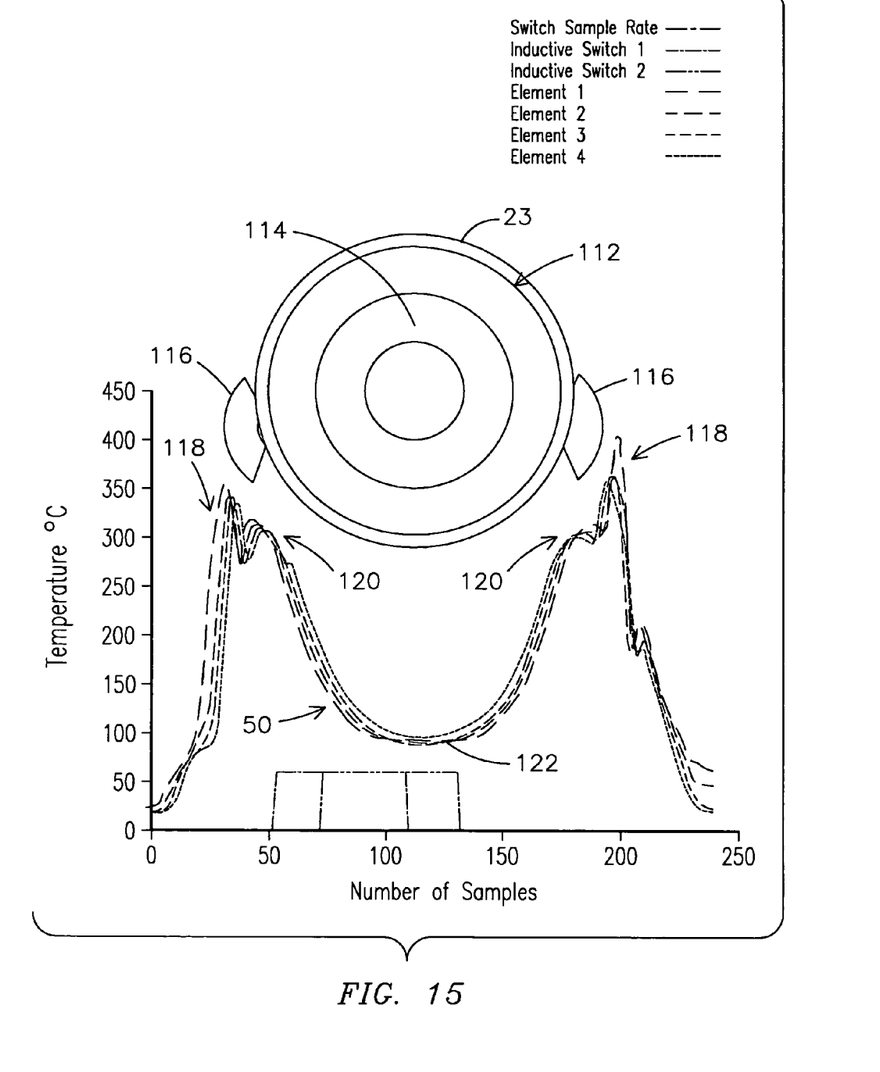
FIG. 15 shows rail wheel components superimposed over an exemplary an IR radiation profile received from a train wheel bearing by the detection system of FIG. 1.
Figure 16A:
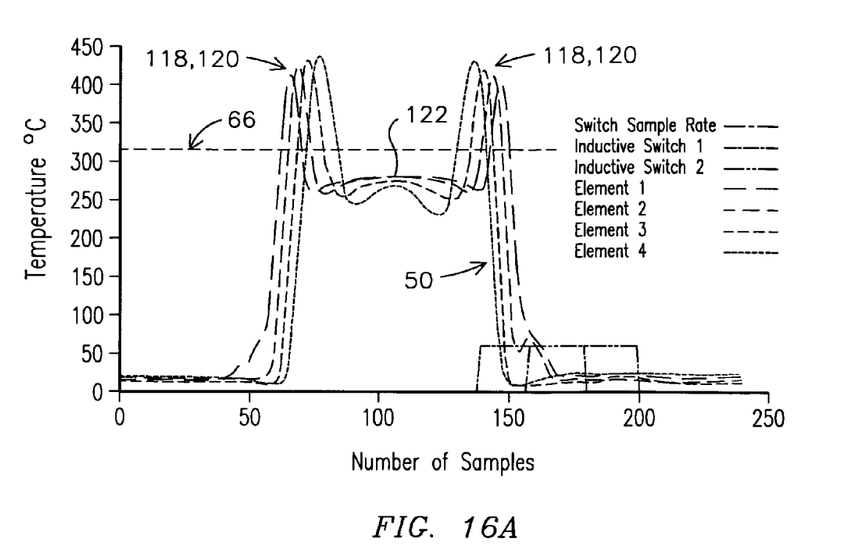
FIG. 16A shows an exemplary graph of a sensed temperature profile indicative of a wheel exhibiting a temperature below an alarm threshold.
Figure 16B:
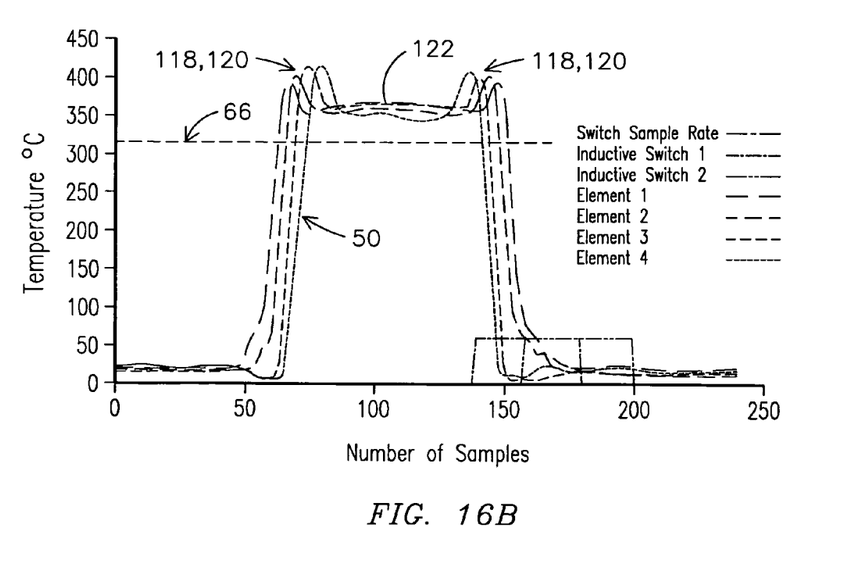
FIG. 16B shows an exemplary graph of a sensed temperature profile indicative of a wheel exhibiting a temperature above an alarm threshold.

FIG. 15 shows rail wheel components contributing identifiable heat profiles superimposed over an exemplary IR radiation profile 50 received from a train wheel 23 by the detection system 10. As shown, brake shoes 116 being applied to the wheel rim 112 create recognizable shoe temperature peaks 118 and rim temperature peaks 120, while a cooler wheel plate 114 of the wheel 23 shows a cooler temperature valley 122 in the profile 50. When analyzing the profile 50 to determine a hot wheel condition, the shoe temperature peaks 118 and rim temperature peaks 120 may be ignored because the wheel plate 114 temperature 122 is the temperature of interest. For example, FIG. 16A shows an exemplary graph of a sensed temperature profile 50 indicative of a braked wheel exhibiting shoe temperature peaks 118 and rim temperature peaks 120 but having a wheel temperature 122 below an alarm threshold 66. FIG. 16B shows an exemplary graph of a sensed temperature profile 50 indicative of a braked wheel exhibiting shoe temperature peaks 118 and rim temperature peaks 120 and also exhibiting a hot wheel condition because the temperature 122 of the wheel plate is above the predetermined threshold 66.

Figure 13A:
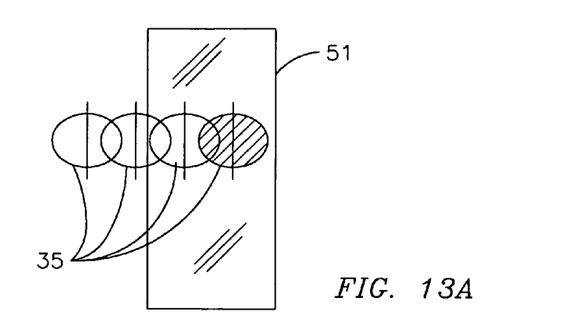
FIG. 13A is a schematic diagram showing area coverage of exemplary IR scanning paths with in a detection window corresponding to a sensed bearing.
Figure 13B:
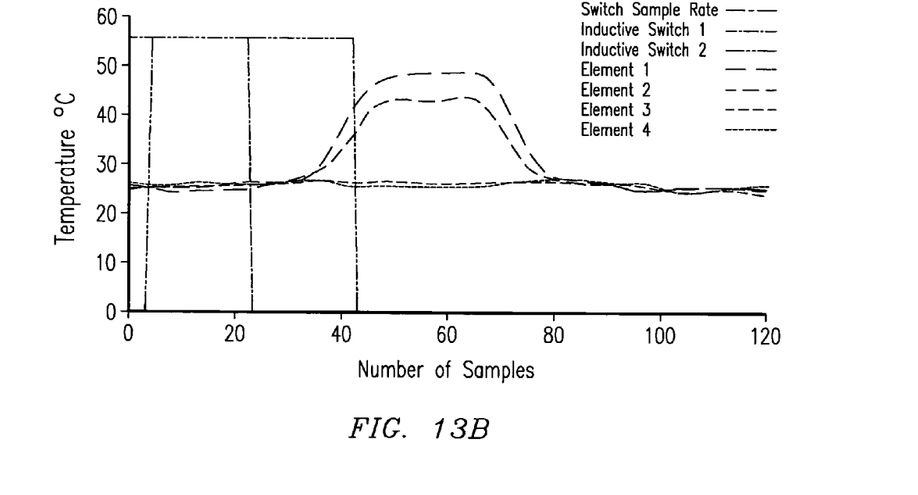
FIG. 13B shows an exemplary graph of a sensed temperature profile corresponding to the area coverage of exemplary IR scanning paths of FIG. 13A.

A position of the window 51 with respect to the IR profile 50 may be selected corresponding to detection of the wheel 23, as indicated by wheel detection pulses 54, 56, so that the window 51 is relatively centered around the windowed portion 58. In another embodiment, the windowed portion 58 may be selected to isolate a certain portion of the received IR energy of interest to be analyzed. In an aspect of the invention, the window 51 may be sized corresponding to a largest diameter bearing profile expected to be encountered, and a center position 53 of the window 51 may be selected to be at a middle of a profile 50 indicative of a centerline of the sensed bearing. FIG. 13A is a diagram showing respective areas of coverage 35 of exemplary IR scanning beams within a detection window 51 corresponding to a sensed bearing wherein 2 of 4 scanning beams fall within the window 51. By utilizing the coverage of the 4 scan beams and dynamically selecting beams with best coverage based on detected heat signatures, a bearing temperature profile may be captured by at least one of the beams regardless of variations in truck positioning. For example, when scanning the inner bearing 20 of FIG. 12, at least some of beams intersect the inner bearing 20, while others of the beams not intersecting the bearing 20 may be ignored. FIG. 13B shows an exemplary graph of a sensed temperature profile corresponding to the areas 35 scanned in FIG. 13A.

Figure 3:
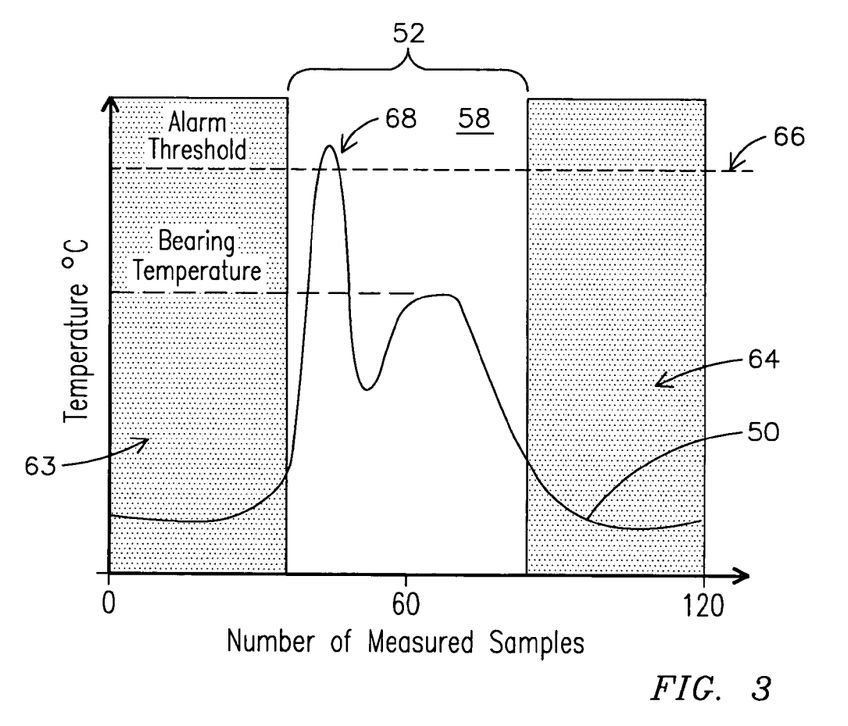
FIG. 3 illustrates another exemplary graph of temperature versus IR sampling points over time for an IR radiation profile received from a train wheel bearing by the detection system of FIG. 1 and shows an energy peak.

In another aspect the invention depicted in FIG. 3, sharp peak profiles 68 relative to an overall detected temperature profile 50, for example, within a window, may be eliminated as being potentially erroneous readings. Such peak profiles 68 may be indicative of parasitic radiation or a reflection and may need to be filtered to allow an accurate determination of bearing temperature. For example, relatively sharp peaks profiles 68 may be identified by setting a threshold for variations in values of a series of samples over a predetermined time period and eliminating any data that indicates a peak profile 68 that is undesirably sharp compared to the overall detected temperature profile 50.

In yet another aspect of the invention, heat sources near a well bearing being sensed, such as exhaust pipes, generators, and suspension components, may interfere with a temperature measurement of the bearing, possibly resulting in detecting an out of range temperature value for the bearing when in fact the bearing temperature is within a desired range. An improved train wheel bearing sensing system includes an IR radiation profile recognition process to identify a component of interest for a temperature measurement. The IR radiation profile recognition process correlates received IR energy to a known bearing configuration, and to filter out, for example, spurious or other IR energy not generated by the bearing configuration being sensed. For example, in FIG. 1, memory 42 may be configured for storing a plurality of known radiation profiles or parameters indicative of radiation profiles for respective bearings or axle profiles that are expected to be sensed by the system 10. The processor 40 may be configured for comparing IR data received from the sensors 12, 14 and accessing the memory 42 to correlate received IR data to a known profile or parameters indicative of a known profile to determine if a received IR profile matches a known profile. For example, the processor 40 may use curve matching techniques to compare curved portions of a known profile to portions of received profile to determine if the received profile matches a known profile. In another aspect, digital signal processing techniques, such as a Fast Fourier Transform, may be performed on the received signal to compare transformed parameters to known parameters.

Figure 4:
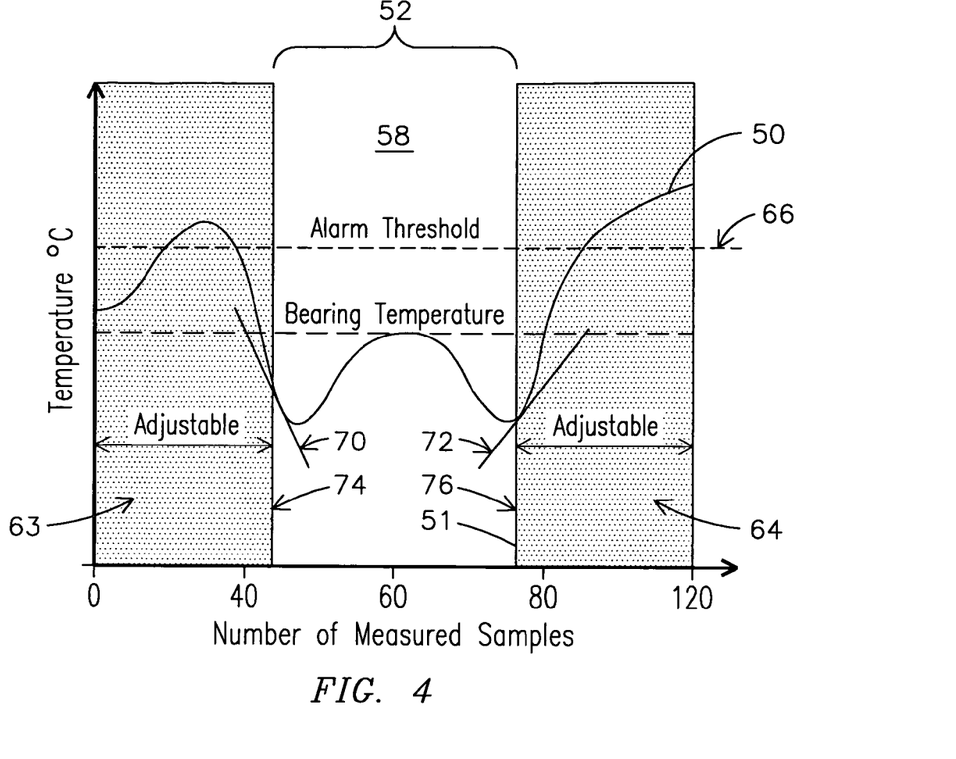
FIG. 4 illustrates another exemplary graph of temperature versus IR sampling points over time for an IR radiation profile received from a train wheel bearing by the detection system of FIG. 1 and shows IR energy contributions received from components other than a train wheel bearing.

FIG. 4 shows an exemplary IR profile for a "W" type bearing heat signature. Known bearing profiles stored in memory 42 may be compared to the received profile 50 to verify that the received profile 50 is an accepted profile for making a bearing temperature measurement. Once a valid profile type is identified, the profile 50 may be checked to determine if it exceeds an alarm threshold 66. Portions 63, 64 of the received profile outside the window 51, potentially indicative of other IR sources besides the bearing, may be disregard before making a comparison. If a received profile does not match a known profile, the measurement may be disregarded or flagged for further investigation.

In another aspect of the invention, emission data received from each of the plurality of sensing elements 29 for the same bearing may be compared to each other to assess a validity of each of the IR profiles provided by the respective sensing elements 29. For example, if one or more IR profiles received from sensing elements 29 of a sensor includes IR energy components in addition to IR energy from a sensed bearing, (such as IR energy radiated by a gearbox adjacent to the sensed bearing) the IR profiles including non-bearing components may be filtered out by using pattern recognition techniques.

In yet another aspect of the invention, gradients 70, 72 of a profile 50 may be measured to determine if an IR radiation measurement includes an IR component from another source. For example, brake disks positioned near wheel bearings are known to cause the gradients 70, 72 a known IR profile 50 at the edges 74, 76 of the evaluation window 51, to be different than expected for the known profile. If one or more gradients 70, 72 appear to be different than expected for a certain profile, then the received profile may be normalized to remove the effects of other IR components and matched to a known profile to make a bearing temperature determination.

FIGS. 7-10 illustrate exemplary conditions of a train wheel and the corresponding IR signal profiles that may be obtained from one embodiment of a train wheel bearing measurement system. For example, blockage of a portion of the wheel bearing and/or heat pipes and lubricant leakage may result in the IR profiles as shown in the IR output signal plot of FIG. 7, where each curve represents the output from a respective sensing element. Sun reflections and/or overheated outer disk brakes may result in the IR profiles as shown in the IR output signal plot of FIG. 8. Flying sparks from sliding wheels may result in the IR profiles as shown in the IR output signal plot of FIG. 9. For an inner bearing, the gear box and retaining parts may interfere with the inner bearing measurement producing the IR profiles as shown in the IR output signal plot of FIG. 10. Using the techniques described previously, such as windowing, peak detection, gradient detection, and pattern recognition, an actual bearing temperature may be extracted from the IR signal profiles.

Figure 14:
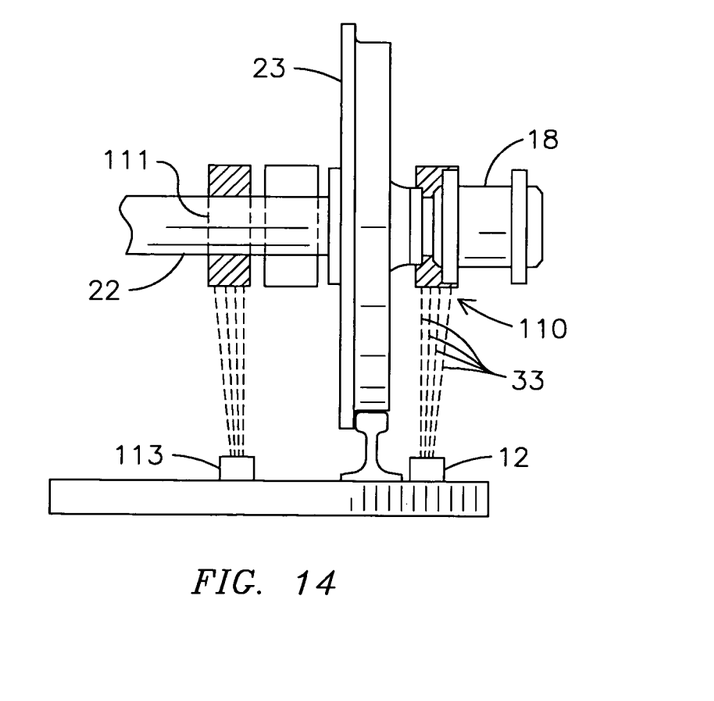
FIG. 14 illustrates exemplary IR scanning paths for scanning an inner raceway portion of an outer bearing.

In another aspect of the invention depicted in FIG. 14, specific portions of a bearing may be detected to analyze a heat signature for the bearing. For example, as shown in FIG. 14, specific bearing raceways, such as inner raceway 110 of an outer bearing 18, may be targeted so that portions 33 of IR emissions corresponding to such components are received by a sensor for analysis. Heat profile information for the sensed portion may be used to pinpoint that portion of a bearing for inspection or repair. In yet another aspect of the invention, the information gathered via IR detection may be analyzed to implement impact and load detection, using for example, pattern recognition techniques of the received profiles 50.

In another aspect of the invention, information acquired using the system 10 may be combined with information from other sources to verify and enhance rail undercarriage component health condition analysis. For example, information collected by other sensors, such as a rail deflection sensor 41, may be associated with corresponding IR emission information collected by the system 10 indicative of a hot bearing condition may be used to verify detection of the condition. The association may be performed in the processor 41 or at a remote location, such as in the monitor 46.

Based on the foregoing description, the methods described may be implemented using computer programming or engineering techniques including computer software, firmware, hardware or any combination or subset thereof, wherein the technical effect is to determine a condition of a rail vehicle undercarriage component exhibiting a scanned waveform signature corresponding to a type of the component in response to being scanned by a sensor. Any such resulting program, having computer-readable code means, may be embodied or provided within one or more computer-readable media, thereby making a computer program product, i.e., an article of manufacture, according to the invention. For example, computer readable media may contain program instructions for a computer program code for processing received imaging data indicative of images acquired in a vicinity of a locomotive. The computer readable media may also include a computer program code for processing received location data indicative of a geographic location of the locomotive when the images are being acquired. In addition, the computer readable media may include a computer program code for accessing a railroad landmark database comprising a plurality of railroad landmarks associated with respective geographic locations constituting landmark tags to correlate the landmark tags with the imaging data and the location data to generate landmark correlated image data.

The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

Figure 5:
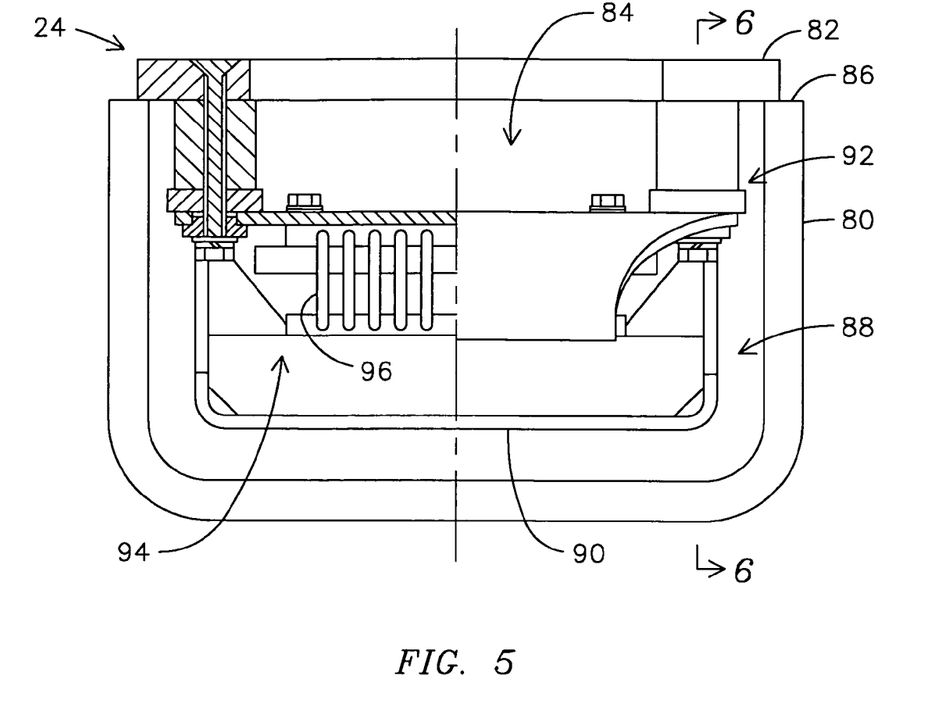
FIG. 5 illustrates a cross sectional view of the sleeper of FIG. 1 taken along line 5-5 and shows a suspension for the system mounted within the sleeper.

When mounted in railroad sleeper 24 of FIG. 1, the system 10 may be subject to vibration and mechanical stresses as a train travels over the sleeper 24. FIG. 5 illustrates a cross section of the sleeper 24 taken along line 5-5 and shows an improved suspension 88, partially cut away, for the system 10 mounted within the sleeper 24. The sleeper 24 may comprise a hollow shell portion 80 having a mounting cavity 84 and a cover 82 attached, for example around a top edge 86 shell 80. The suspension 88 suspends a carrier 90 to which the components of the system 10, such as sensors 12,14 (not shown) may be attached, and isolates the carrier 90, and any system components attached thereto, from vibration and shock.

In an aspect of the invention, the suspension 88 includes a cover attachment portion 92 attached to the cover 82, a carrier attachment portion 94 attached to the carrier 90, and a deformable element 96 disposed between the cover attachment portion 92 and the carrier attachment portion 94 for allowing relative movement between the portions 92 and 94. The deformable element 96 element may be attached to the either or both of the portions 92 and 94.

Figure 6:
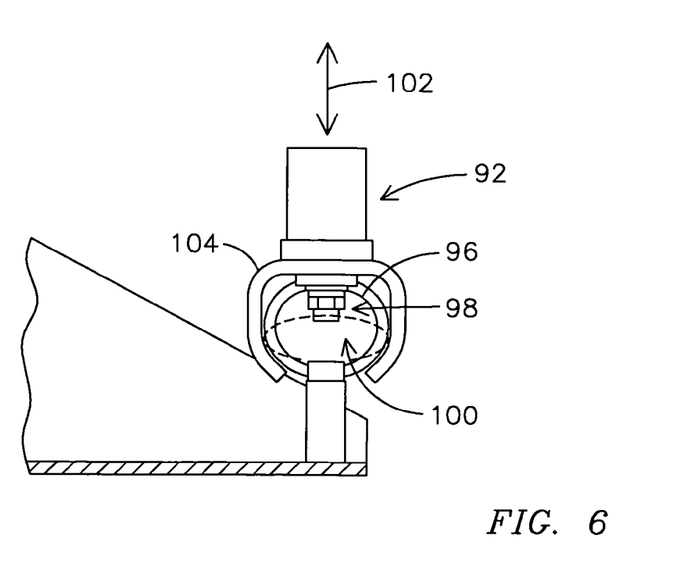
FIG. 6 illustrates partial cross sectional view of the suspension of FIG. 5 taken along line 6-6.
Figure 7:
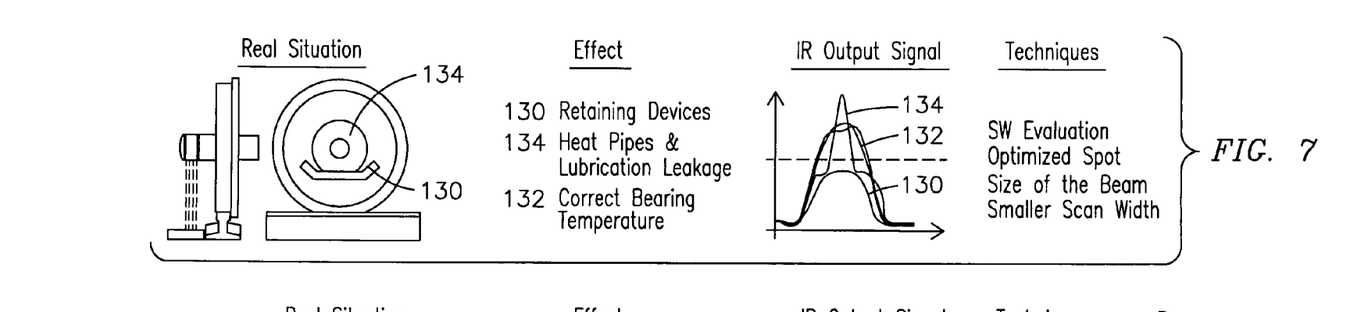
FIGS. 7-10 illustrate exemplary conditions of a train wheel and the corresponding IR signal profiles that may be obtained from an embodiment of the train wheel bearing measurement system.
Figure 8:
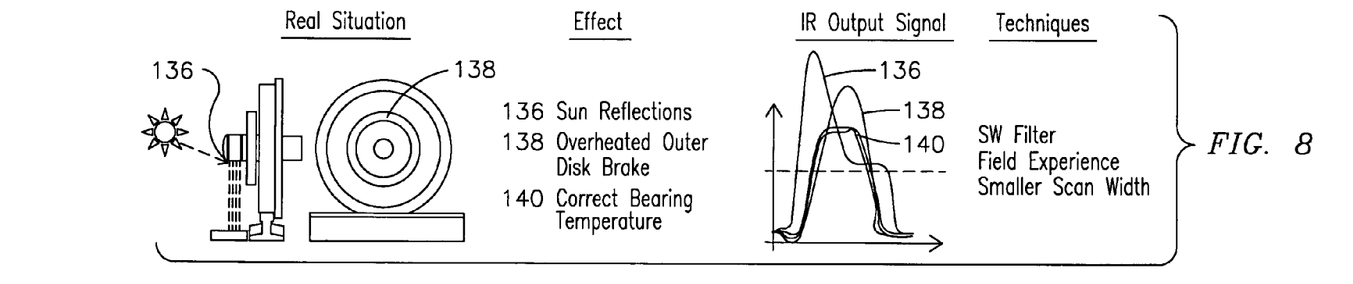
Figure 9:
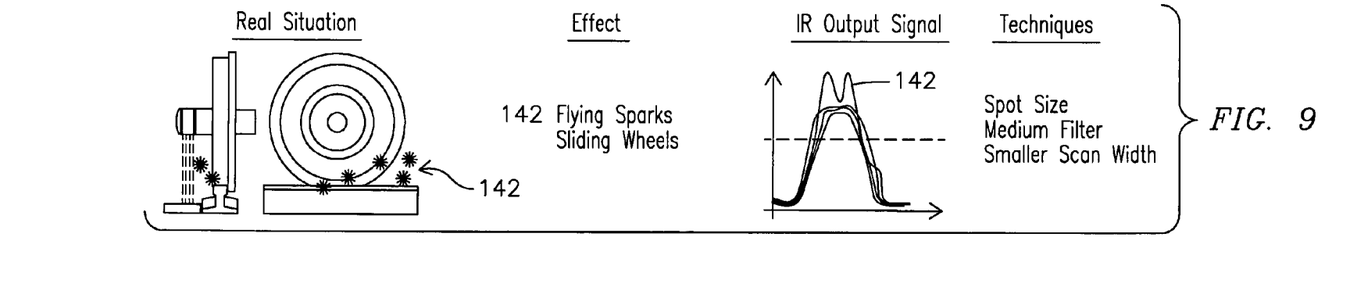
Figure 10:
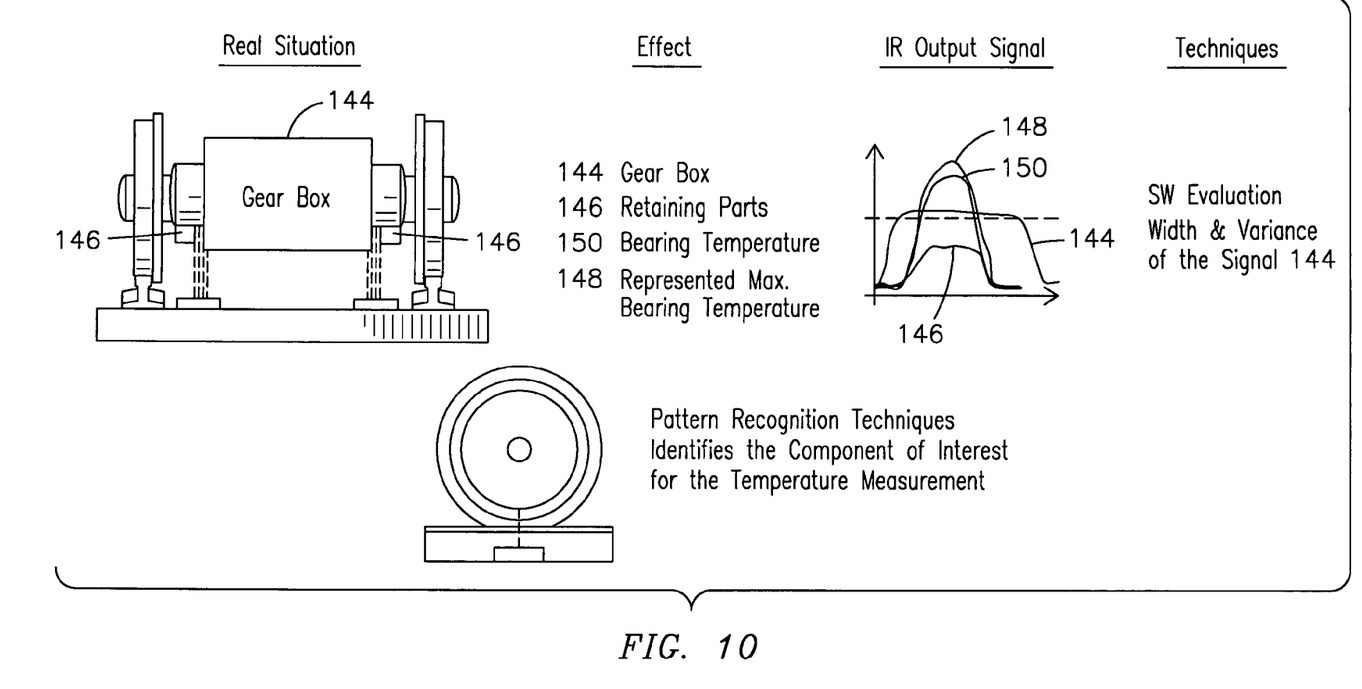

In an embodiment depicted in FIG. 6, the deformable element 96 comprises a tubular element, such as a spring, which is deformable, for example, in cross section from a circular cross section 98 to an oval cross section 100 (indicated by the solid line oval) biased against a force 102 applied via the cover attachment portion 92. The suspension 88 may include a deformation limiting member 104, for example, partially enclosing the deformable element 96 to limit an amount of deformation experienced by the deformable element 96. In an embodiment, the deformation limiting member 104 may comprise a "C"-shaped cross sectional shaped member having a size selected to limit a deformation of the deformable element 96 to a desired amount. The deformable element 96 may be attached to the cover attachment portion 92, the carrier portion 94, or both portions 92, 94 to allow movement of the portions 92, 94 relative to one another.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A system for sensing a condition of a rail vehicle undercarriage component comprising:
 a sensor comprising an array of infrared sensing elements, each of the elements aimed at a different region of a target area of at least one rail vehicle undercarriage component to generate respective scanning waveform signature data corresponding to each different region, the sensor oriented so that at least one of the elements receives unobstructed infrared emissions from the at least one undercarriage component of a rail vehicle passing the sensor, wherein the at least one undercarriage component includes an inner wheel bearing of a rail wheel axle, wherein the inner wheel bearing is inwardly positioned relative to the rail wheel;
 a memory for storing characteristic waveform signature data corresponding to known undercarriage components; and
 a processor in communication with the sensor and the memory and configured to process the scanning waveform signature data with respect to the characteristic waveform signature data stored in memory to identify a type of one or more of the at least one rail vehicle undercarriage component being scanned, including identifying the inner wheel bearing and identifying the type of another component inwardly positioned relative to the wheel, the processor being further configured to extract information indicative of a health condition of at least one of the rail vehicle undercarriage components being identified,
 wherein the extracted information indicative of the health condition includes an infrared temperature profile, and
 wherein the infrared temperature profile includes a relationship between a temperature of the at least one rail vehicle undercarriage component versus temperature sampling points over time of an infrared emission from the scanned component.

2. The system of claim 1, further comprising a wheel sensor generating wheel passage data for use by the processor to correlate wheel position with the scanning waveform signature data.

3. The system of claim 1, further comprising a rail deflection sensor generating rail deflection data for use by the processor to correlate sensed rail deflection with the scanning waveform signature data.

4. The system of claim 1, further comprising a transmitter for transmitting health information to a device remote from the processor.

5. The system of claim 4, wherein the transmitter comprises a receiver for receiving information from the remote device.

6. The system of claim 1, further comprising a database in communication with the processor for providing train reference information for a train being scanned by the system.

7. The system of claim 1, wherein the sensor is disposed to aim the elements at an acute angle with respect to an orientation of the component of the rail vehicle undercarriage.

8. The system of claim 1, wherein the sensor further comprises a calibration element receiving infrared radiation from a temperature standard for use in calibrating the other elements of the sensor.

9. The system of claim 1, wherein the different regions at least partially overlap one another.

10. The system of claim 1, wherein the sensor is disposed between parallel rails of a railway over which the rail vehicle travels.

11. The system of claim 1, wherein the sensor is disposed in a railbed of a railway over which the rail vehicle travels.

12. The system of claim 11, wherein the sensor is disposed in a sleeper embedded in the railbed.

13. The system of claim 1, wherein processing the scanning waveform signature data with respect to the characteristic waveform signature data stored in memory to identify a type of one or more of the at least one rail vehicle undercarriage component being scanned includes identifying the inner wheel bearing and identifying a gear box inwardly positioned relative to the wheel.

14. The system of claim 1, wherein the processor processes the scanning waveform signature data based at least in part on the speed of the rail vehicle.

15. The system of claim 1, wherein the processor is configured to determine an adjustable detection window in the scanning waveform signature data with respect to a target area of a respective undercarriage component, the adjustable detection window configured to impede an unwanted source of infrared emission from affecting the scanning waveform signature data for the component.

16. The system of claim 1, wherein identifying the inner wheel bearing and identifying the type of another component inwardly positioned relative to the wheel includes using curve-matching techniques to identify the components.

17. A method for determining a condition of a rail vehicle undercarriage component exhibiting a scanned waveform signature corresponding to a type of the component in response to being scanned by a sensor, the method comprising:
    acquiring scanned waveform signature data corresponding to radiation from at least one rail vehicle undercarriage component being scanned by a sensor, wherein the at least one undercarriage component includes an inner wheel bearing of a rail wheel axle and the inner wheel bearing is inwardly positioned relative to the rail wheel;
    identifying a type of one or more of the at least one rail vehicle undercarriage component based on the received scanned waveform signature data, including identifying the inner wheel bearing and identifying the type of another component inwardly positioned relative to the wheel; and
    processing the acquired scanned waveform signature data to determine a condition of at least one of the components based on the identified type of component,
    wherein processing the acquired scanned waveform signature data includes creating an infrared temperature profile, and
    wherein the infrared temperature profile includes a relationship between a temperature of the at least one rail vehicle undercarriage component versus temperature sampling points over time of an infrared emission from the scanned component.

18. The method of claim 17, wherein identifying a type of one or more of the at least one rail vehicle undercarriage component comprises comparing the acquired scanned waveform signature data to at least one of a plurality of known characteristic waveform signatures.

19. The method of claim 17, wherein processing the acquired scanned waveform signature data comprises filtering the data to remove information not characteristic of the identified type.

20. The method of claim 17, wherein processing the acquired scanned waveform signature data comprises determining when a portion of the data exceeds a preset threshold.

21. The method of claim 17, wherein processing the acquired scanned waveform signature data comprises correlating a sensed rail wheel position with corresponding waveform signature data acquired for undercarriage components associated with the wheel.

22. The method of claim 21, further comprising generating a window of desired waveform signature data based on a correlation of the sensed rail wheel position with the corresponding scanned waveform signature data.

23. The method of claim 22, further comprising ignoring portions of the scanned waveform signature data outside the window.

24. The method of claim 17, wherein identifying a type of one or more of the at least one rail vehicle undercarriage component based on the received scanned waveform signature data includes identifying the inner wheel bearing and identifying a gear box inwardly positioned relative to the wheel.

25. The method of claim 17, wherein processing the acquired scanned waveform signature data includes processing the acquired scanned waveform signature data based at least in part on the speed of the rail vehicle.

26. The method of claim 17, further comprising:
    determining an adjustable detection window in the scanning waveform signature data with respect to a target area of a respective undercarriage component; and
    configuring the adjustable detection window to impede an unwanted source of infrared emission from affecting the scanning waveform signature data for the component.

27. The method of claim 17, wherein identifying the inner wheel bearing and identifying the type of another component inwardly positioned relative to the wheel includes using curve-matching techniques to identify the components.

28. A method for determining a condition of a rail vehicle undercarriage component comprising:
    scanning at least one rail vehicle undercarriage component with an array of sensors, each sensor aimed at a different region of a scanned target area of the at least one component, to generate respective scanned waveform signature data corresponding to each different region, wherein the at least one undercarriage component includes an inner wheel bearing of a rail wheel axle and the inner wheel bearing is inwardly positioned relative to the rail wheel;
    processing the data to identify a type of one or more of the at least one rail vehicle undercarriage component being scanned, including identifying the inner wheel bearing and identifying the type of another component inwardly positioned relative to the wheel, wherein processing the data includes creating an infrared temperature profile, and wherein the infrared temperature profile includes a relationship between a temperature of the at least one rail vehicle undercarriage component versus temperature sampling points over time of an infrared emission from the scanned component; and
    filtering the data according to the identified type of at least one of the components to remove information not characteristic of the identified type.

29. The method of claim 28, wherein filtering comprises truncating information corresponding to an undesired region of the target area.

30. The method of claim 28, wherein the different regions at least partially overlap one another.

31. The method of claim 28, further comprising:
determining an adjustable detection window in the scanning waveform signature data with respect to a target area of a respective undercarriage component; and
configuring the adjustable detection window to impede an unwanted source of infrared emission from affecting the scanning waveform signature data for the component.

32. A system for sensing a condition of a rail vehicle undercarriage component from a location between parallel rails of a railway over which a rail vehicle travels, the system comprising:
a sensor disposed between parallel rails of a railway for scanning at least one undercarriage component of a rail vehicle for travel on the railway proximate the sensor and for generating scanning data corresponding to the at least one undercarriage component being scanned, wherein the at least one undercarriage component includes an inner wheel bearing of a rail wheel axle and the inner wheel bearing is inwardly positioned relative to the rail wheel; and
a processor in communication with the sensor for processing the scanning data to extract information from the data indicative of a health condition of one or more of the at least one undercarriage component, the processor being configured to use the scanning data to identify a type of one or more of the at least one rail vehicle undercarriage component being scanned, including identifying the inner wheel bearing and identifying the type of another component inwardly positioned relative to the wheel,
wherein the extracted information indicative of the health condition includes an infrared temperature profile, and
wherein the infrared temperature profile includes a relationship between a temperature of the at least one rail vehicle undercarriage component versus temperature sampling points over time of an infrared emission from the scanned component.

33. The system of claim 32, wherein the sensor is disposed in a railbed of the railway between the parallel rails.

34. The system of claim 33, wherein the sensor is disposed in a sleeper embedded in the railbed.

35. The system of claim 32, wherein the sensor comprises an infrared sensor for receiving the infrared emission from the scanned component.

36. The system of claim 32, wherein the processor is configured to determine an adjustable detection window in the scanning waveform signature data with respect to a target area of a respective undercarriage component, the adjustable detection window configured to impede an unwanted source of infrared emission from affecting the scanning waveform signature data for the component.

* * * * *